UNITED STATES PATENT OFFICE.

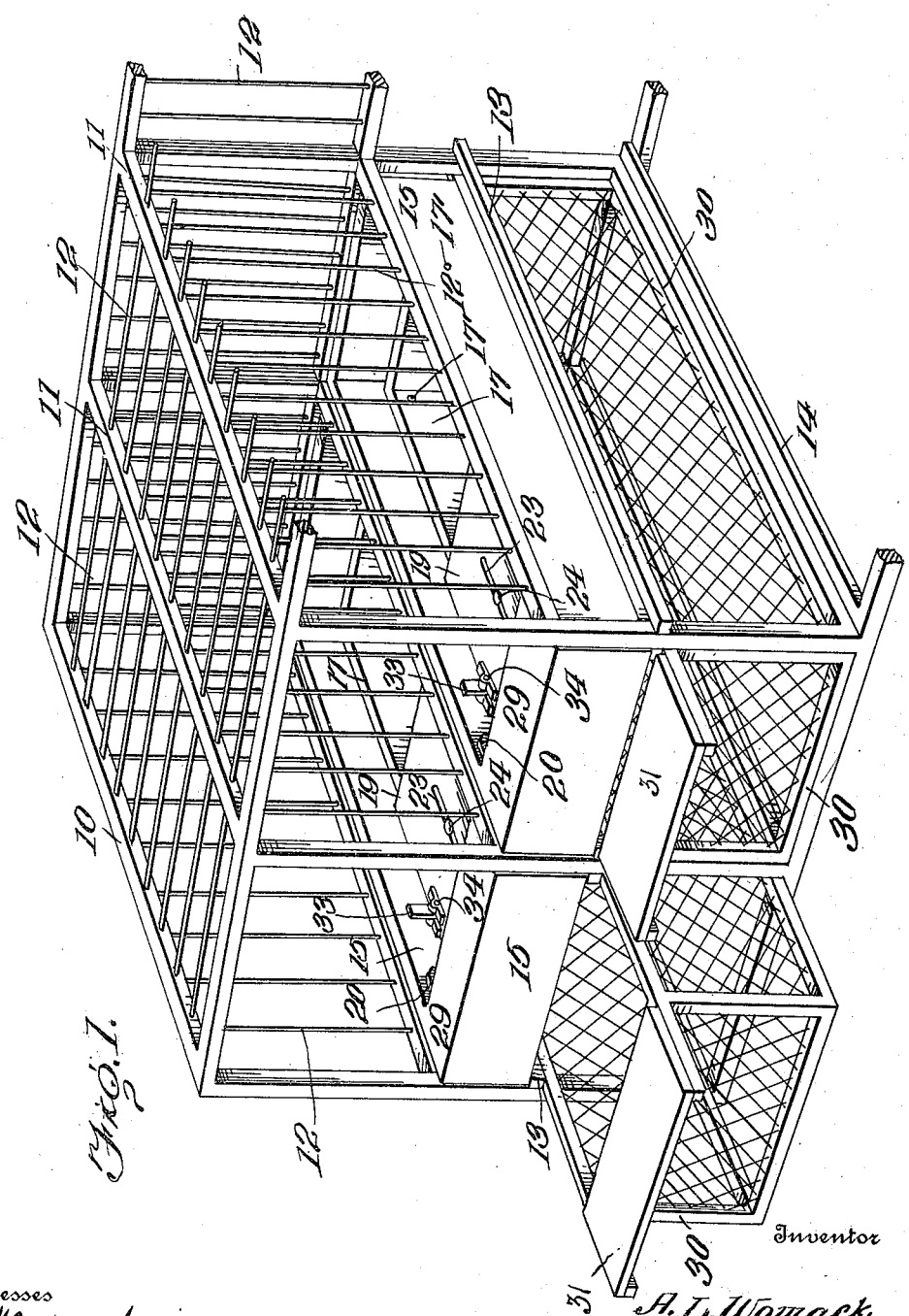

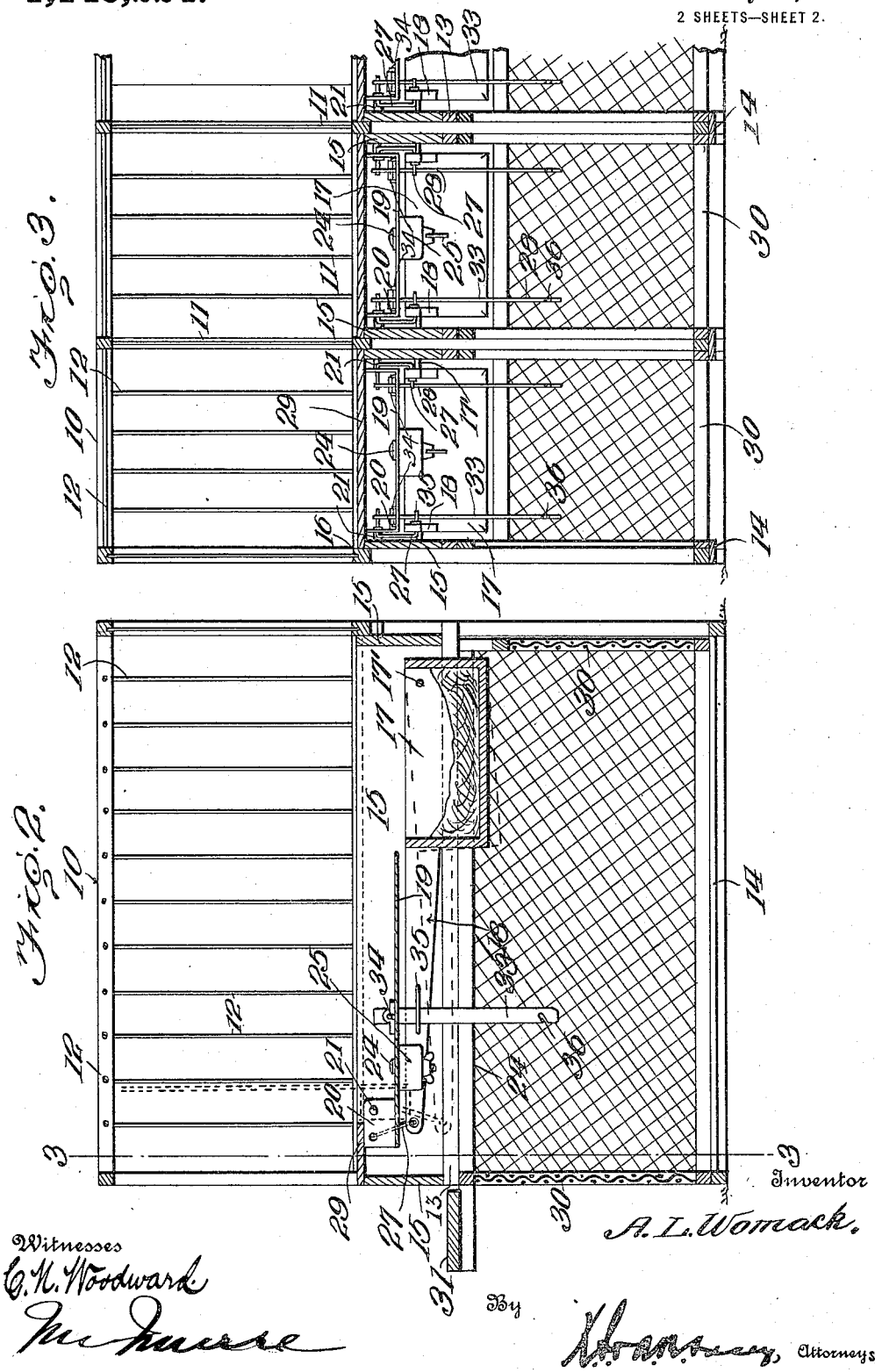

ALBERT L. WOMACK, OF LA GRANGE, MISSOURI.

TRAP-NEST.

1,146,224.   Specification of Letters Patent.   Patented July 13, 1915.

Application filed March 12, 1914. Serial No. 824,209.

*To all whom it may concern:*

Be it known that I, ALBERT L. WOMACK, citizen of the United States, residing at La Grange, in the county of Lewis and State of Missouri, have invented certain new and useful Improvements in Trap-Nests, of which the following is a specification.

This invention relates to improvements in hens' nests, more particularly to the class of trap nests, and has for one of its objects to improve the construction and increase the efficiency and utility of devices of this character.

Another object of the invention is to provide a simply constructed device whereby the hen is protected from intrusion during the laying operation and the nest automatically arranged to receive the next hen by the act of the hen when leaving the nest.

Another object of the invention is to provide a device of this character wherein provision is made for removing the hen without injury after the egg-laying operation and without disturbing another hen who may be in position upon the nest just vacated by the first-mentioned hen.

Another object of the invention is to provide a device of this character in which provision is made for locking the nest in open position so that the hen is free to enter or leave the nest as desired.

Another object of the invention is to provide a device of this character in which provision is made for keeping the eggs laid by the individual hens separated, if desired.

Another object of the invention is to provide a device of this character in which provision is made for protecting a setting hen from intrusion, and permit her to exercise and feed during the setting operation.

Another object of the invention is to provide a device of this character in which provision is made for utilizing the supporting frame work for perches.

With these and other objects in view the invention consists in certain novel features of construction as hereinafter shown and described and then specifically pointed out in the claims; and in the drawings illustrative of the preferred embodiment of the invention Figure 1 is a perspective view of the improved device. Fig. 2 is a longitudinal sectional elevation of the improved device. Fig. 3 is a transverse section on the line 3—3 of Fig. 2.

Corresponding and like parts are referred to in the following description and indicated in all the views of the drawings by the same reference characters.

The improved device may be arranged with a single nest and its operating attachments, or a group of nests, as may be preferred, and it is not desired therefore to limit the invention in this respect, but for the purpose of illustration the device is arranged with a group of the nests, and comprises a supporting frame represented as a whole at 10 and divided by partitions 11 into a plurality of compartments, one compartment for each nest and its attachments. The frame 10 may be constructed of any suitable material, but will preferably be formed in openwork with spaced rods or slats 12 forming a portion of the sidewalls and the top, so that while the hens are protected from intrusion while in the nest, the requisite ventilation and light are secured.

The side portions of the frame 10 and the partitions 11 are provided with upper cleats 13 to support the nest support and its attachments and lower cleats 14 to support the cages into which the hens pass after the laying operation.

The nest supports and their attachments and the cages are precisely alike for each compartment, and the description of one will suffice for all. Slidably disposed in each compartment of the supporting frame 10 is a nest supporting frame represented as a whole at 15 and bearing upon the upper cleats 13. The frame 10 is open at the front, and the members 15 and their attachments may be inserted into and removed from the frame 10 through the front in the same manner as an ordinary drawer is actuated in a desk or bureau. A nest box, represented conventionally at 17, is pivoted at 17' in each of the frames 15, the pivots being located near the rear end of the frame and the nest box provided with forwardly projecting arms or bars 18, one at each side of the nest.

Disposed within the frame 15 between the nest box and the front of the frame is a combined runway and closure 19 having upwardly directed wings or ears 20 at its forward end to receive pivots 21 whereby the member 19 is swingingly supported within the frame 15. Each of the members 19 is provided with a longitudinally directed slot 23 through which a bolt 24 extends and arranged to adjustably support a controlling weight 25 which is utilized to balance the member 19. Coupled respectively at their ends to the ears 20 and the forward ends of the members 18 are links 27. By this arrangement it will be obvious that the weight 25 will hold the members 19 normally in horizontal position, while the coupling members 27 will likewise retain the nest box 17 and its arms 18 normally in horizontal position, as shown in Figs. 1 and 2. At its forward end the member 15 is provided with an inwardly directed stop member 29, which extends partly over the wings 20 and with which the latter engage when the member 19 is in horizontal position and thus limit the downward movement thereof. The member 29 likewise prevents the hen when passing to the member 19 from engaging the shorter end, or the portion in advance of the pivot 21, the object to be hereafter explained.

Located within each compartment and beneath each of the nests and its attachments is a cage-like device without any bottom and comprises a supporting frame represented as a whole at 30 and supported at its lower side upon the cleats 14. The sides of each cage project upwardly beneath the upper cleats 13, while the front of each cage fills the space beneath the member 15. The rear side of each cage is of less height than the sides and front so that it will pass beneath the nest box 17 when the cage is removed and inserted. Each cage is provided with a shelf-like member 31 which extends in advance of the frame 10 and forms a support upon which the hen mounts when passing to the nest, and called a lighting board. Operating through a slot 32 at one side of each of the members 19 is a bar 33 which extends downwardly alongside of one of the sides of the member 15, and is limited in its downward movement by a pin 34 which is connected to the upper face of the member 19. Connected to one of the arms 18 is a guard loop 35 through which the member 33 operates. The member 33 is provided with a notch 36 at its lower end which engages with one end of the loop 35, and thus locks the member 19 when in elevated or closed position. By this arrangement when the nest 17 is empty the weight 25, as before stated, maintains the parts of the device normally in the position shown in Figs. 1 and 2. When a hen mounts the lighting shelf or board 31 and passes over the support 29 she is prevented from engaging the member 19 forwardly of the pivot 21, hence will not depress or otherwise affect the member 19. The hen passes over the member 19 to the nest 17 and when her weight is thus transferred to the nest the latter is slightly depressed upon its pivot 17' and causes the depression of the arms 18 which acting through the links 27 tilt the member 19 into vertical position and thus shut off access to or egress from the nest, but leave the cage 30 open and accessible from the nest. When the hen has laid the egg she passes into the cage below, and as the nest is relieved from the weight of the hen the balancing weight 25 immediately depresses the member 19 and restores the nest to its former position ready to receive the next hen, while at the same time the member 19 prevents the hen who has passed to the cage from returning to the nest. The cage will be large enough to hold any required number of the hens, but if it is desired to release the hen from the cage the latter may be drawn outwardly without disturbing the nest mechanism and the hen within the cage removed manually, or permitted to fly out the cage, or the cage entirely removed and raised upwardly to release the hen and then returned to its position beneath the nest device and without disturbing the latter. If a setting hen is occupying the nest 17 the member 33 is utilized to lock the member 19 in its elevated position, leaving the hen upon the nest but accessible to the cage for exercise or to be fed and then free to return to the nest. This portion of the device will be found very useful in connection with setting hens, as will be obvious, as the setting hens can thus be protected from intrusion. By this arrangement the frame 15 and the nest box carried thereby may be drawn outwardly for removing the eggs or attending to a setting hen, or for cleansing or fumigating the nest. The cages and nest box supports may thus be entirely removed when required, leaving every portion readily accessible.

The improved device is simple in construction, can be inexpensively manufactured of any suitable material and may be constructed wholly of metal or partly of metal and partly of wood as may be required.

Having thus described the invention, what is claimed as new is:

1. In an apparatus of the class described, an inclosure having an opening, a nest device movable relative to said inclosure and intermediate the top and bottom thereof, a runway movably supported and normally bridging the space between said nest device and the opening of the inclosure and rendering the nest accessible, an arm extending from said nest device, connecting means between said arm and said runway whereby the depression of the nest and its arm elevates the runway to close the opening to the inclosure, a member depending from said runway, and means carried by said arm for engaging said depending member when the arm is in one position to lock the runway in elevated position.

2. In an apparatus of the class described, an inclosure having an opening, a nest device movable relative to said inclosure and intermediate the top and bottom thereof, a runway movably supported and normally bridging the space between said nest device and the opening of the inclosure and rendering the nest accessible, an arm extending from said nest device, connecting means between said arm and said runway whereby the depression of the nest and arm elevates the runway to close the opening to the inclosure, a member depending from said runway and having a notch, and a guide loop carried by said arm and through which said depending member operates and with which the notch engages when the runway is elevated, to lock the runway in elevated position.

3. In an apparatus of the class described, an inclosure having an opening, a nest device movable relative to said inclosure and intermediate the top and bottom thereof, a runway movably supported and normally bridging the space between said nest device and the opening of the inclosure and rendering the nest accessible, and connecting means between the nest device and the runway, whereby the runway is caused to be elevated to close the opening of the inclosure and render the inclosure below the nest accessible from the nest when the nest device is actuated by the weight of the hen.

4. In an apparatus of the class described, a nest device, a cage below the line of the nest device, a runway movably disposed for closing access to the cage when in one position, and connecting means between the nest device and runway, whereby the runway is actuated to render the cage accessible from the nest by the weight of the hen therein.

5. In an apparatus of the class described, an inclosure open at one end, a cage removably disposed within said inclosure and including a portion of the open front thereof, a nest device movably disposed relative to the inclosure, a runway movable relative to the inclosure between the nest device and the inclosure opening above the cage, and connecting means between the nest device and the runway, whereby the runway is elevated to close the upper portion of the inclosure opening and render the cage accessible from the nest by the weight of the hen.

6. In an apparatus of the class described, an inclosure open at one end, a cage removably disposed within said inclosure and closing a portion of the open front thereof, a frame slidable in said inclosure, a nest device movably disposed within said frame, a runway movable within said frame, and connecting means between the nest device and the runway, whereby the runway is elevated to close the upper portion of the inclosure opening and render the cage accessible from the nest by the weight of the hen therein.

7. In an apparatus of the class described, an inclosure open at one end and having upper and lower guide members, a cage slidable upon the lower guide members and closing a portion of the open front of the inclosure, a frame slidable upon the upper guide members, a nest device movably disposed within said frame, a runway movable within said frame, and connecting means between the nest device and the runway, whereby the runway is elevated to close the upper portion of the inclosure opening and render the cage accessible from the nest by the weight of the hen therein.

In testimony whereof I affix my signature in presence of two witnesses.

ALBERT L. WOMACK. [L. S.]

Witnesses:
M. LOUISE WOLFF,
WILLIAM V. ACCOLA.

Copies of this patent may be obtained for five cents each, by addressing the "Commissioner of Patents, Washington, D. C."